May 13, 1941.   R. R. WARE   2,241,685
WHEEL
Filed July 7, 1938.
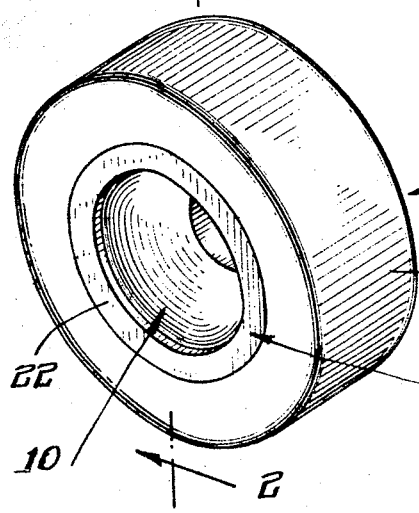
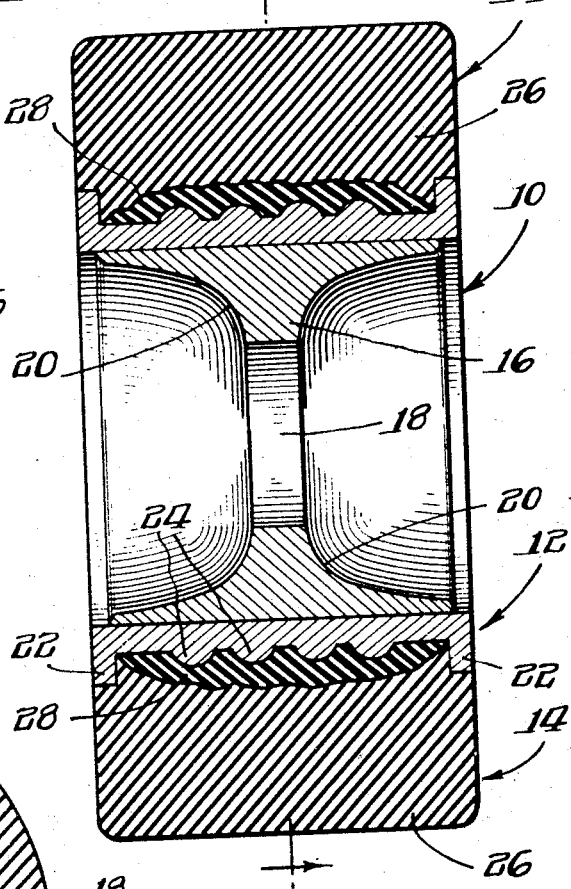
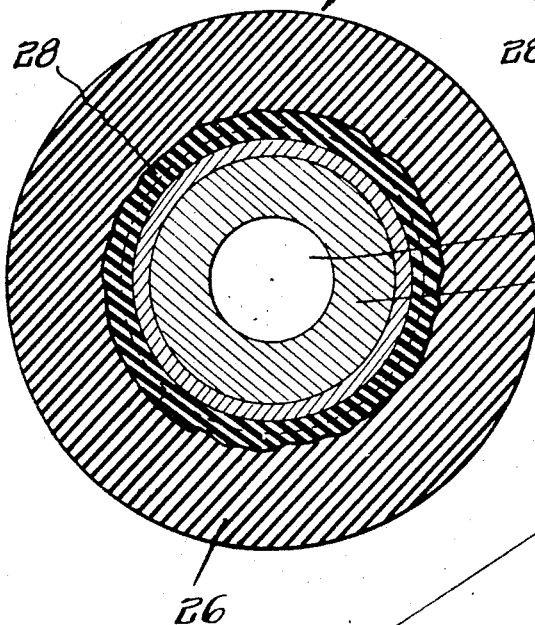
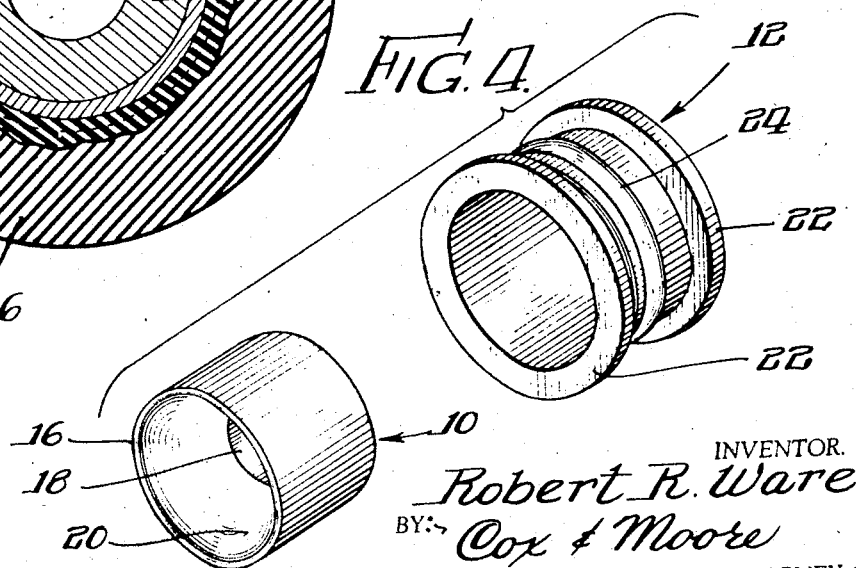
INVENTOR.
Robert R. Ware
BY: Cox & Moore
ATTORNEYS.

Patented May 13, 1941

2,241,685

UNITED STATES PATENT OFFICE 2,241,685

WHEEL

Robert R. Ware, Chicago, Ill., assignor to Chicago Roller Skate Company, Chicago, Ill., a corporation of Illinois Application July 7, 1938, Serial No. 217,855

3 Claims. (Cl. 301—5.3)

The present invention relates to a roller or wheel for use particularly on roller skates.

More specifically, the present invention contemplates the provision of a resilient wheel or roller for use on so-called "dustless" floors. Floors so designated are those which are waxed and therefore relatively slippery. A wheel or roller to be used in this relationship must necessarily present numerous difficulty attainable characteristics. First of all, it is important that the wheel be of such character that it does not mark, score or otherwise damage the floor. On the other hand, the engagement between the surface of the floor and the resilient tire must be such as to produce considerable frictional engagement to provide the necessary traction for figure and fancy skating.

A wheel of relatively hard material would obviously be unsuitable for this purpose. A soft resilient plastic, such as soft rubber, may not be suitable, due to the fact that the wheels at all points must have considerable rigidity and maintain their form if they are to be used for roller skating. In other words, such wheels in respect to their relative size normally in service support a considerable weight and at the same time are subjected to abnormal stresses in various directions, all of which stresses must be transmitted by the wheel without causing collapse or substantial deflection thereof. The aforementioned stresses in service are extremely destructive of bonds and junctures and in the past there has been a known tendency for roller skate wheels formed of several parts to become loosened, separated and disassembled after a period of service.

It is accordingly an object of the present invention to provide a new and improved wheel particularly adapted for use in roller skates and which is particularly adapted for use on a so-called "dustless" floor, such as a ballroom floor, being capable of frictionally engaging the floor without damaging the surface thereof.

Another object of the present invention is to provide an improved rubber tired wheel of the above character which possesses sufficient resiliency to permit it to be employed upon delicate floor surfaces but at the same time has sufficient rigidiy and stiffness so that it does not deform or lose its shape under the stresses which are applied during skating.

An additional object of the present invention is to provide a wheel for a roller skate having a tire of rubber or equivalent plastic material, in which the tire is attached to the central collar portion of the wheel through the intermediate agency of a resilient interconnecting member which is adapted tenaciously to engage both the collar and the tire at all times.

Yet other and further objects, advantages and inherent functions of the invention will become apparent as the same is more fully understood from the following description, which, taken in connection with the accompanying drawing, discloses a preferred embodiment of the invention.

Referring to the drawing:

Fig. 1 is a perspective view of a wheel constructed in accordance with the present invention;

Fig. 2 is a sectional view taken through the wheel of Fig. 1 on the line 2—2;

Fig. 3 is a sectional view taken on the line 3—3 of Fig. 2; and

Fig. 4 is a perspective view showing the collar and bushing forming the central portion of the wheel.

Referring more specifically to the figures of the drawing, Fig. 1 illustrates one form of a roller skate wheel constructed in accordance with the present invention, and comprising a central bushing 10, a collar 12 mounted on the bushing, and a resilient tire portion 14. The central bushing 10 is so constructed as to provide a central annular radially inwardly extending portion 16 providing a central aperture 18 for the passage of an axle, according to the construction known in the art. The bushing is further provided with opposed annular bell shaped or curved surfaces 20 for receiving the balls of a ball bearing structure. In other words, the surfaces 20 of the bushing provide the ball races for the roller.

The collar or sleeve 12 is rigidly and firmly secured upon the bushing by means of a press fit, to be hereinafter described more in detail. The collar 12 comprises in general a tube having outwardly extending annular flanges 22 at either end thereof. The outer surface of the collar intermediate of the flanges 22 is configurated to provide a plurality of annularly extending ribs, ridges or corrugations 24.

The outer tire or resilient portion 14 of the wheel is molded directly onto the collar 12, see Fig. 3, and consists in general of two portions, namely, the outer tire or load supporting portion 26 and the inner attaching or securing portion 28. As pointed out above, it is particularly important to note that of the wide range and variety of plastic and structural materials available, those capable of being used in the present structure are quite limited in number. For manufacturing a wheel in accordance with the present invention, it has been found that the numerous problems relating to the use of roller skates on so-called "dustless" floors are obviated when the tire portion 26 of the wheel comprises a vulcanized rubber composition having a hardness of from about seventy-four (74) to about (82) on a Duromiter scale, using an instrument manufactured by the Shore Instrument Manufacturing Company, Jamaica, New York. This composition gives sufficient rigidity so that the form of the resilient portion of the wheel is maintained against collapse while at the same time the wheel is capable of use on slippery, waxed surfaces without resulting in damage of the surface, and permits the desired frictional interengagement with the floor. It is to be understood, however, that the present invention is not limited to the use of rubber compositions but that other equivalent resilient plastic materials may be substituted therefor, preferably having a hardness within the range given above. It will be appreciated to those skilled in the art that the term "hardness," as used above, requires interpretation, but it is thought that such interpretation will be readily facilitated by the foregoing description of the required properties.

The bonding or interconnecting layer 28 comprises a relatively harder, yet relatively thin, layer of appreciably soft, resilient rubber which is adapted to be vulcanized to the collar 12. In other words, it has been found, in accordance with the present invention, that the material forming the tire portion 26 of the wheel is only difficultly vulcanizable to a brass collar, and that the side stresses transmitted during use, and directly applied through the material of the tire, tend to destroy the bond at the juncture between the brass and the rubber. The interposition of the layer 28 obviates this difficulty. This layer 28 may comprise any suitable plastic material adapted to be vulcanized or otherwise secured with great tenacity to the adjacent metallic surface and also to the plastic tire portion 26. All stresses and strains are therefore normally transmitted through the portions 26 and 28, being partially absorbed in the latter plastic layer, without destruction of the adjacent bonds.

Attention is particularly directed to the fact that the annular ribs or corrugations 24 are in direct bonding engagement with the plastic layer 28 and it has been found in accordance with the present invention that this and equivalent configuration greatly tend to enhance the strength of the juncture. More specifically, the provision of projecting, preferably curved surfaces on the outer portion of the sleeve or collar 12, is responsible for substantially increased security of engagement. It is desirable that a sufficient number of corrugations 24 be provided to set up a resistance generally equal to the lateral stresses encountered by the rubber tire in service.

The resilient portions may be directly vulcanized to the collar 12 by placing the layer 28 and the layer 26 in position while in the unvulcanized state and subjecting the assembly to sufficient heat and pressure to produce vulcanization.

It is to be further noted that the rubber tired portion 14 of the wheel is of relatively great radial thickness and forms the major portion of the wheel, so that all hard portions of the hub are substantially removed from the floor surface. Thus the resilient floor contacting portions are applied to the floor under the influence of their own resiliency, as compared with a structure wherein a relatively thin layer of plastic is in effect greatly rigidified by a relatively hard supporting means positioned close to the tread surfaces.

It has further been discovered in accordance with the present invention that improved interconnection between the bushing 10 and the collar 12 is had if a fine coat of a vulcanized rubber is applied to the surface of the bushing before it is pressed into the ring, sleeve or tube forming the member 12. This may be accomplished by dusting the outer surface of the bushing with fine particles of vulcanized rubber, for example, or otherwise applying a plastic in a suitable solvent. The bushing is then forced into the sleeve 12 under pressure and results in added tight fit between the parts.

The present invention provides an improved roller skate wheel which while being capable of use with substantially perfect safety and ease upon "dustless" floors, is simple and inexpensive to manufacture. The wheel is additionally capable of resisting wear to a high degree and will not become disassembled under the stresses encountered in normal use.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A roller skate wheel having a hub portion comprising an annular metallic collar, a tire mounted upon said hub and comprising a relatively soft resilient floor contacting portion having a durometer hardness of from 74 to 82, said floor contacting portion being of substantial thickness and extending substantially completely from the hub to the circumferential periphery of the wheel, an intermediate layer of resilient soft plastic material interposed between said tire and said hub portion and being permanently attached to both of said portions by coincidental vulcanization for integrally joining said tire and hub, said intermediate layer of plastic material being adapted to vulcanize to the material of said collar with substantially greater adhesion than the material of the tire portion and said hub surface comprising a plurality of annularly disposed circumferential ribs having an outwardly convex surface to which the said intermediate portion is vulcanized.

2. A roller skate wheel having a hub portion comprising an annular metallic collar, a tire mounted upon said hub and comprising a relatively soft resilient floor contacting portion comprising rubber having a durometer hardness of from 74 to 82, said floor contacting portion being of substantial thickness and extending substantially completely from the hub to the circumferential periphery of the wheel, an intermediate layer of soft rubber interposed between said tire and said hub portion and being permanently attached to both of said portions by coincidental vulcanization for integrally joining said tire and hub, said intermediate layer of soft rubber being adapted to vulcanize to the material of said collar with substantially greater adhesion than the material of the tire portion and said hub surface comprising a plurality of annularly disposed circumferential ribs having an outwardly convex surface to which the said intermediate portion is vulcanized.

3. A roller skate wheel having a hub portion comprising an annular metallic collar, a tire mounted upon said hub and comprising a relatively soft resilient floor contacting portion having a durometer hardness of from 74 to 82, said floor contacting portion being of substantial thickness and extending substantially completely from the hub to the circumferential periphery of the wheel, an intermediate layer of resilient soft plastic material interposed between said tire and said hub portion and being permanently attached to both of said portions by coincidental vulcanization for integrally joining said tire and hub, said intermediate layer of plastic material being adapted to vulcanize to the material of said collar with substantially greater adhesion than the material of the tire portion.

ROBERT R. WARE.